S. F. KRUPP.
SPACING BLOCK.
APPLICATION FILED DEC. 28, 1912.
1,125,565.
Patented Jan. 19, 1915.
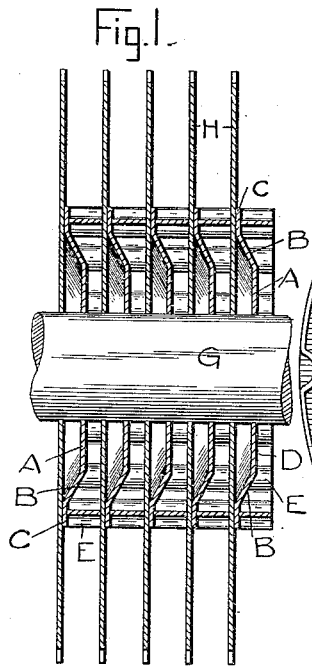
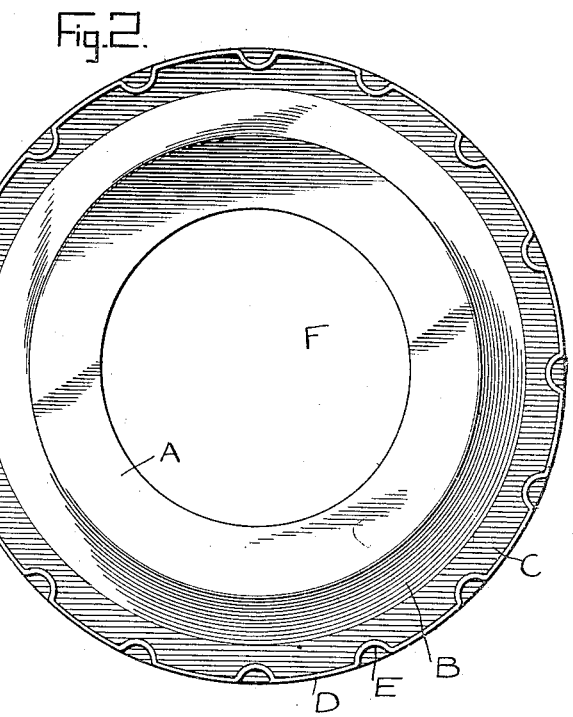
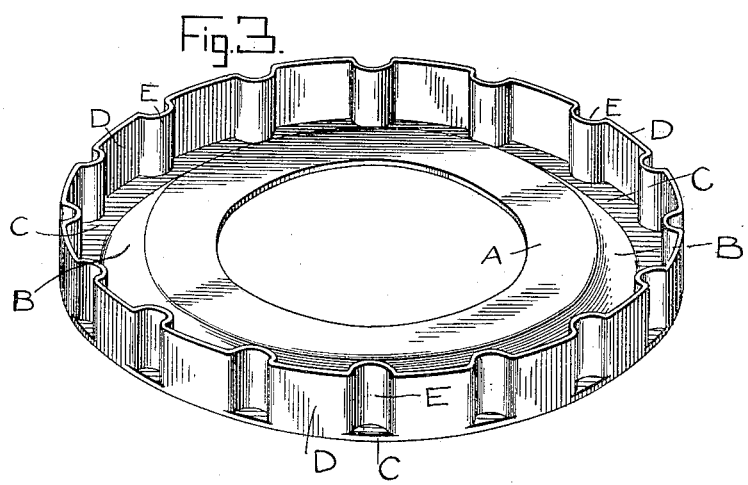
WITNESSES
INVENTOR
Smith F. Krupp,
BY
ATTORNEYS

UNITED STATES PATENT OFFICE.

SMITH FREDERICK KRUPP, OF ATLANTA, GEORGIA.

SPACING-BLOCK.

1,125,565.  Specification of Letters Patent.  Patented Jan. 19, 1915.

Application filed December 28, 1912. Serial No. 739,069.

*To all whom it may concern:*

Be it known that I, SMITH F. KRUPP, a citizen of the United States, and a resident of Atlanta, in the county of Fulton and State of Georgia, have invented a new and Improved Spacing-Block, of which the following is a full, clear, and exact description.

The invention relates to saw cylinders of cotton gins, cotton seed delinters and similar machines, and its object is to provide a new and improved spacing block of minimum weight, maximum strength and one which can be cheaply manufactured and permits of being placed easily in position on the saw shaft or arbor to accurately space the adjacent saws the desired distance apart and to hold the saws parallel to the plane of rotation of the saw cylinder.

In order to accomplish the desired result the spacing block is formed from a single piece of sheet metal shaped to provide a fluted rim, and a web having its outer portion integral with one edge of the said rim, the web being arranged intermediate the edges of the rim.

A practical embodiment of the invention is represented in the accompanying drawings forming a part of this specification, in which similar characters of reference indicate corresponding parts in all the views.

Figure 1 is a longitudinal central section of a saw cylinder provided with the improved spacing blocks; Fig. 2 is an enlarged face view of one of the spacing blocks; and Fig. 3 is a perspective view of the same.

The spacing block is formed from a single piece of sheet metal shaped to provide a web A having an outwardly deflected portion B terminating in a flange C integrally connected with one edge of a rim D provided with flutes E. The web A is provided with a central opening F fitting the shaft or arbor G of the saw cylinder, as plainly indicated in Fig. 1. The web A extends approximately midway between the edges of the rim D so that the web is located approximately midway between adjacent saws H held on the shaft G.

In constructing the spacing block the ends of the flutes E adjacent the flange C are cut so that the said ends rest or abut on the flange C to give the desired strength to the flutes E. When the parts are assembled to form a saw cylinder, as shown in Fig. 1, then the outer face of each flange C abuts against one face of a saw H, while the opposite face of the next adjacent saw is engaged by the free edge of the rim D and the corresponding edge of the flute E, and consequently a large bearing surface is had at both sides of the spacing block for the two adjacent saws to rest on. It will further be noticed that by the arrangement described, the fluted rim D is of uniform width with the edges parallel to the plane of rotation of the saw cylinder, so that the saws H are held accurately spaced apart and parallel to the plane of rotation of the saw cylinder.

The spacing block constructed in the manner described is of minimum weight and maximum strength, and can be cheaply constructed as it requires only the necessary dies to strike up a single piece of sheet metal to form the spacing-block in the manner above set forth.

Having thus described my invention, I claim as new and desire to secure by Letters Patent:

1. A spacing block for saw cylinders formed from a single piece of sheet metal shaped to provide a fluted rim, and a web having its outer portion integral with one edge of the said rim, the web being arranged intermediate the edges of the rim.

2. A spacing block for saw cylinders formed from a single piece of metal and having a fluted rim, and a web approximately in a plane intersecting the middle of the rim, the web having its outer portion deflected outwardly and terminating in a flange integrally connected with one edge of the rim.

3. A spacing block for saw cylinders formed from a single piece of metal and having a fluted rim, and a web provided with a central aperture for engagement by the shaft, the said web being arranged in a plane intersecting the middle of the rim and the web having its outer portion deflected outwardly and terminating in a flange integrally connected with one edge of the rim, each of the flutes of the rim having one end abutting the said flange.

4. A saw cylinder for ginning machinery, comprising a shaft, a plurality of saws on the said shaft, and spacing blocks on the said shaft, one between adjacent saws, each spacing block being formed from a single piece of metal, and having a rim provided with inwardly-extending spaced flutes, the edges of the rim abutting against the faces of adjacent saws, and each spacing block having a web arranged in a plane intersecting the middle of the rim, the web having its outer portion deflected outwardly and terminating in a flange integrally connected with one edge of the rim, each of the flutes having one end abutting the said flange.

5. A spacing block for saw cylinders formed from a single piece of metal and having a rim, and a web approximately in a plane intersecting the middle of the rim, the web having its outer portion deflected outwardly and terminating in a flange integrally connected with one edge of the rim.

In testimony whereof I have signed my name to this specification in the presence of two subscribing witnesses.

SMITH FREDERICK KRUPP.

Witnesses:
D. L. NICHOLS,
H. A. TISDEL.

Copies of this patent may be obtained for five cents each, by addressing the "Commissioner of Patents, Washington, D. C."